(12) United States Patent
Seto

(10) Patent No.: US 8,525,920 B2
(45) Date of Patent: Sep. 3, 2013

(54) IMAGING APPARATUS AND SIGNAL PROCESSING METHOD FOR CHECKING A PHOTOGRAPHED IMAGE IN A MULTI-BAND CAMERA IMMEDIATELY

(75) Inventor: Takamasa Seto, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 342 days.

(21) Appl. No.: 12/797,438

(22) Filed: Jun. 9, 2010

(65) Prior Publication Data

US 2010/0321522 A1 Dec. 23, 2010

(30) Foreign Application Priority Data

Jun. 19, 2009 (JP) ................................. 2009-146751

(51) Int. Cl.
*H04N 5/232* (2006.01)
*H04N 9/083* (2006.01)
*H04N 3/14* (2006.01)
*H04N 5/335* (2011.01)

(52) U.S. Cl.
USPC ........................................... 348/349; 348/278

(58) Field of Classification Search
USPC ................... 348/223.1, 224.1, 273, 278, 279, 348/349
See application file for complete search history.

(56) References Cited

U.S. PATENT DOCUMENTS

| 5,202,756 | A | * | 4/1993 | Sasaki et al. | 348/223.1 |
| 5,581,298 | A | * | 12/1996 | Sasaki et al. | 348/222.1 |
| 7,460,160 | B2 | * | 12/2008 | Hershey et al. | 348/273 |
| 7,548,264 | B2 | * | 6/2009 | Mitsunaga et al. | 348/272 |
| 7,589,772 | B2 | * | 9/2009 | Coifman et al. | 348/263 |
| 7,612,822 | B2 | * | 11/2009 | Ajito et al. | 348/336 |
| 7,768,560 | B2 | * | 8/2010 | Katsumata et al. | 348/272 |
| 7,839,437 | B2 | * | 11/2010 | Kasai et al. | 348/238 |
| 7,868,936 | B2 | * | 1/2011 | Ajito et al. | 348/271 |
| 7,868,937 | B2 | * | 1/2011 | Mizukura et al. | 348/278 |
| 7,903,157 | B2 | * | 3/2011 | Takada et al. | 348/278 |
| 7,990,447 | B2 | * | 8/2011 | Honda et al. | 348/294 |
| 8,081,311 | B2 | * | 12/2011 | Themelis | 356/419 |
| 8,098,300 | B2 | * | 1/2012 | Ishibashi | 348/234 |
| 8,134,618 | B2 | * | 3/2012 | Ajito et al. | 348/278 |
| 8,199,229 | B2 | * | 6/2012 | Masuno et al. | 348/276 |
| 8,233,058 | B2 | * | 7/2012 | Hattori | 348/223.1 |
| 8,411,176 | B2 | * | 4/2013 | Katagiri et al. | 348/278 |
| 2005/0099513 | A1 | * | 5/2005 | Ishibashi | 348/234 |
| 2006/0109358 | A1 | * | 5/2006 | Song et al. | 348/275 |
| 2008/0037972 | A1 | * | 2/2008 | Takeda et al. | 396/79 |
| 2009/0102943 | A1 | * | 4/2009 | Hattori | 348/223.1 |
| 2009/0115869 | A1 | * | 5/2009 | Ojima et al. | 348/223.1 |
| 2010/0283866 | A1 | * | 11/2010 | Numata | 348/223.1 |

(Continued)

FOREIGN PATENT DOCUMENTS

| JP | 2000333186 | A | * | 11/2000 |
| JP | 2001005046 | A | * | 1/2001 |
| JP | 2003-87806 | A | | 3/2003 |
| JP | 2006-311524 | A | | 11/2006 |

(Continued)

*Primary Examiner* — John Villecco
(74) *Attorney, Agent, or Firm* — Canon USA Inc. IP Division

(57) ABSTRACT

Output signals (pixel values) output from a sensor unit in which image sensors having six kinds of color filters with different colors are arranged are classified in association with three stimulus values, a color number is reduced by performing addition processing of the output signals (pixel values) in each classification to generate an image signal of three bands, and the generated image signal is used for the preview display so that a photographed image can be checked easily and immediately.

13 Claims, 8 Drawing Sheets

(56) References Cited

U.S. PATENT DOCUMENTS

| | | | |
|---|---|---|---|
| 2011/0074992 A1* | 3/2011 | Ajito et al. | 348/279 |
| 2011/0122283 A1* | 5/2011 | Nagata | 348/223.1 |
| 2011/0149126 A1* | 6/2011 | Mitsui et al. | 348/278 |
| 2012/0200755 A1* | 8/2012 | Nagata | 348/302 |

FOREIGN PATENT DOCUMENTS

| | | | |
|---|---|---|---|
| JP | 2008-160210 A | | 7/2008 |
| JP | 2010010958 A | * | 1/2010 |
| JP | 2010276442 A | * | 12/2010 |
| JP | 2010278711 A | * | 12/2010 |

* cited by examiner

FIG. 2

| R1 | G1 | B1 | G1 | R1 | G1 | |
|----|----|----|----|----|----|---|
| G2 | R2 | G2 | B2 | G2 | R2 | |
| B1 | G1 | R1 | G1 | B1 | G1 | |
| G2 | B2 | G2 | R2 | G2 | B2 | |
| R1 | G1 | B1 | G1 | R1 | G1 | |
| G2 | R2 | G2 | B2 | G2 | R2 | |
| | | | | | | |

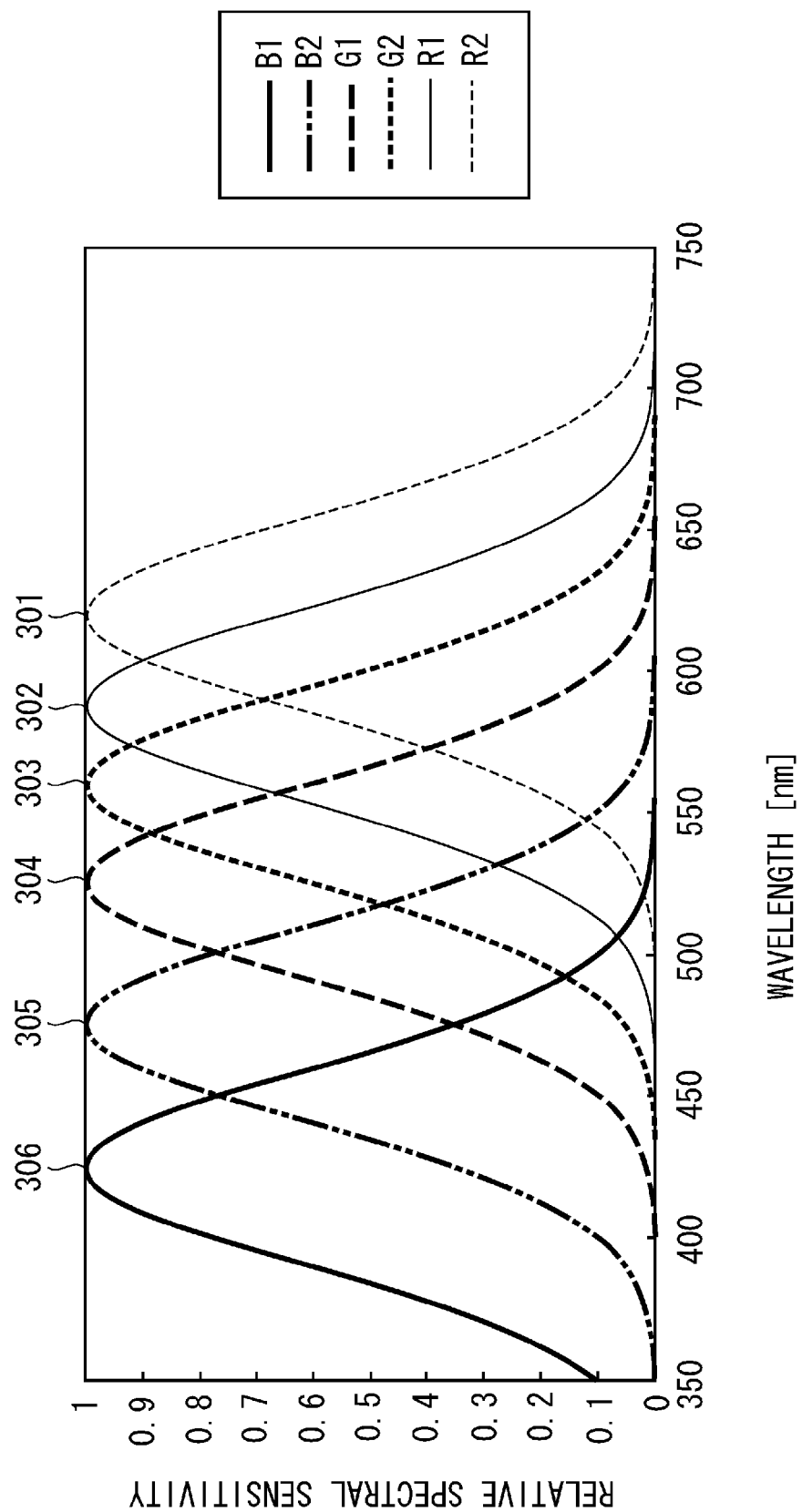

FIG. 6B $$\underbrace{\phantom{XXXXXXXX}}_{M/2}$$

| R1+R2<br>+R2+R1 | | R1+R2<br>+R2+R1 |
|---|---|---|
| | | |
| R1+R2<br>+R2+R1 | | R1+R2<br>+R2+R1 |

$N/2$ { (rows)   R

FIG. 6A $$\underbrace{\phantom{XXXXXXXXXX}}_{M}$$

| R1 | R2 | G1 | G2 | R1 | R2 |
|---|---|---|---|---|---|
| R2 | R1 | G2 | G1 | R2 | R1 |
| G1 | G2 | B1 | B2 | G1 | G2 |
| G2 | G1 | B2 | B1 | G2 | G1 |
| R1 | R2 | G1 | G2 | R1 | R2 |
| R2 | R1 | G2 | G1 | R2 | R1 |

$N$

FIG. 6C $$\underbrace{\phantom{XXXXXXXX}}_{M/2}$$

| | G1+G2<br>+G2+G1 | |
|---|---|---|
| G1+G2<br>+G2+G1 | | G1+G2<br>+G2+G1 |
| | G1+G2<br>+G2+G1 | |

$N/2$   G

FIG. 6D $$\underbrace{\phantom{XXXXXXXX}}_{M/2}$$

| | | |
|---|---|---|
| | B1+B2<br>+B2+B1 | |
| | | |

IMAGING APPARATUS AND SIGNAL PROCESSING METHOD FOR CHECKING A PHOTOGRAPHED IMAGE IN A MULTI-BAND CAMERA IMMEDIATELY

BACKGROUND OF THE INVENTION

1. Field of the Invention

The present invention relates to an imaging apparatus, a signal processing method, and a program, and particularly relates to a signal processing technique concerning a multi-band image signal acquired by the imaging apparatus.

2. Description of the Related Art

A multi-band camera having more bands than the conventional three bands composed of red (R), green (G), and blue (B) is being developed to acquire spectral image data recording the spectrum of an object. For example, Japanese Patent Application Laid-Open No. 2003-87806 discusses configuration of a multi-band camera having color filters of six bands or more to acquire spectral data of an object.

However, the amount of data of spectral image data acquired by a multi-band camera becomes large. If, for example, the spectrum of an object of 400 nm to 700 nm is acquired and recorded in increments of 10 nm, it becomes necessary to use color information in 31 dimensions so that when compared with a conventional RGB 3-band camera, ten times or more the data storage capacity will be needed. Moreover, display devices capable of displaying such a spectral image are currently limited to special display devices. Most conventional display devices make a color display using three primary colors of R, G, and B. To generate image data displayable in such a conventional display device, it is necessary to convert a vast amount of spectral image data into image data of R, G, and B. Thus, processing in which real-time processing is demanded such as a preview of photographing results particularly by a multi-band camera and auto-focus (AF) processing using a photographed image cannot be performed in real time.

SUMMARY OF THE INVENTION

The present invention is directed to enabling checking of a photographed image in a multi-band camera immediately.

According to an aspect of the present invention, an imaging apparatus includes an imaging unit in which image sensors having four kinds of color filters or more with different colors are arranged, a color number reduction processing unit that generates an image signal of three bands corresponding to three stimulus values, from output signals corresponding to the four kinds of color filters or more output from the imaging unit, a color temperature estimation unit that estimates a color temperature of a photographing light source based on the image signal of the three bands generated by the color number reduction processing unit, a white balance processing unit that performs white balance processing based on the color temperature estimated by the color temperature estimation unit, and a display unit that displays the image signal processed by the white balance processing unit.

According to another aspect of the present invention, an imaging apparatus includes an imaging unit in which image sensors having four kinds of color filters or more with different colors are arranged, a color number reduction processing unit that generates an image signal of three bands corresponding to three stimulus values from output signals corresponding to the four kinds of color filters or more output from the imaging unit, and an auto-focus control unit that exercises control concerning focusing of an object image in the imaging unit based on the image signal generated by the color number reduction processing unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a diagram illustrating an arrangement of color filters in a sensor unit.

FIG. 3 is a diagram illustrating an example of spectral sensitivity characteristics of the color filters.

FIGS. 4A, 4B, 4C, and 4D are diagrams illustrating a processing example by a color number reduction processing unit in the first exemplary embodiment.

FIGS. 6A, 6B, 6C, and 6D are diagrams illustrating another example of processing by the color number reduction processing unit.

FIGS. 7A, 7B, 7C, and 7D are diagrams illustrating another example of processing by the color number reduction processing unit.

DESCRIPTION OF THE EMBODIMENTS

Figure 1:
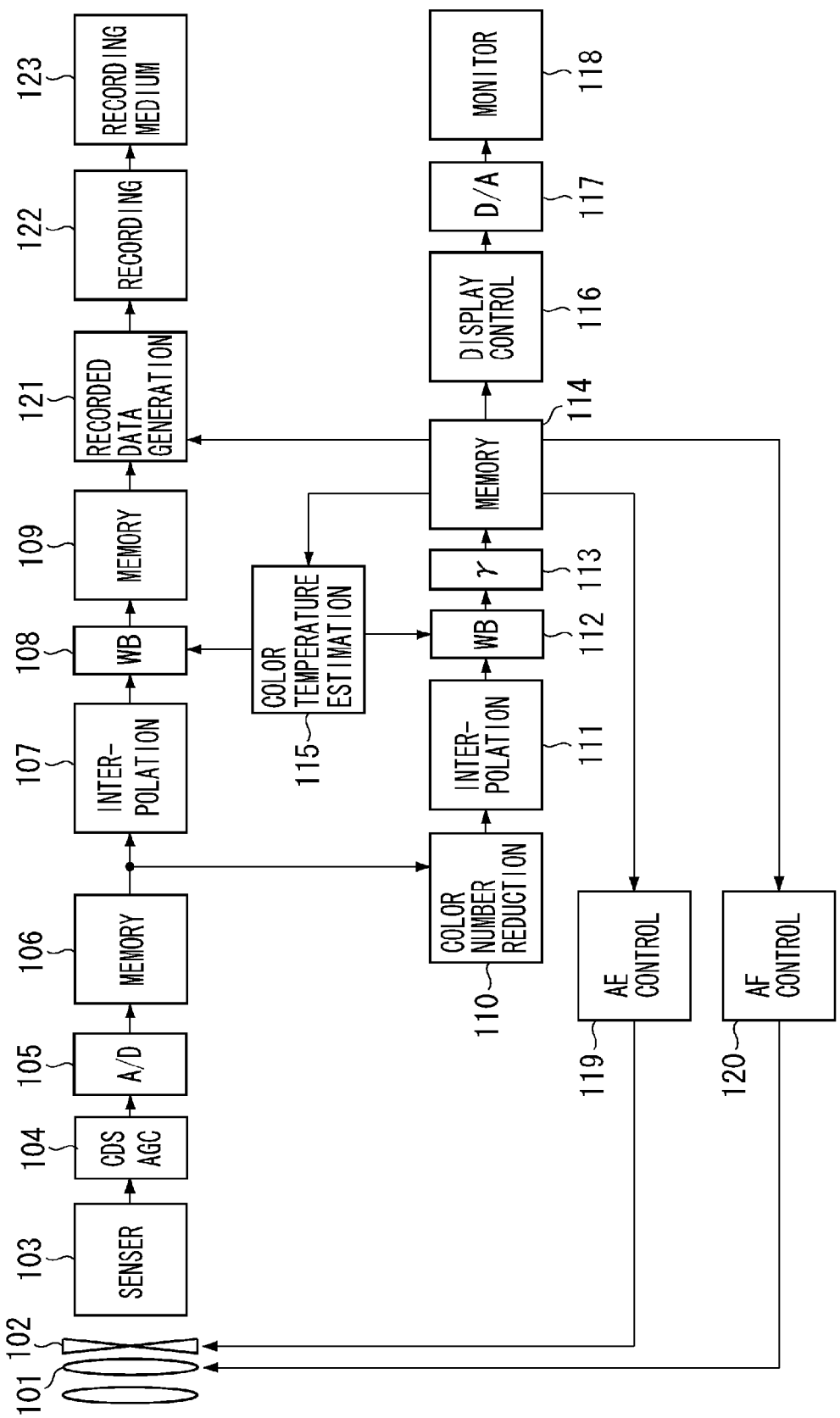
FIG. 1 is a diagram illustrating a configuration example of an imaging apparatus in a first exemplary embodiment.

FIG. 1 is a block diagram illustrating a configuration example of an imaging apparatus (for example, a digital still camera) according to the first exemplary embodiment.

In FIG. 1, light (object image) from an object is adjusted by a focus lens 101 to focus on a sensor unit 103 and the amount of light is adjusted by an iris 102 before the light reaches the sensor unit 103. In the sensor unit (imaging unit) 103, image sensors having four kinds of color filters or more with different colors are arranged. In the present exemplary embodiment, it is assumed that image sensors having six kinds of color filters as illustrated, for example, in FIG. 2 on a sensor surface thereof are arranged.

FIG. 3 illustrates spectral sensitivity characteristics of the image sensors corresponding to each color filter. In FIG. 3, relative spectral sensitivity 301 corresponds to a spectral sensitivity characteristic of an image sensor corresponding to a color filter R1 in FIG. 2 and relative spectral sensitivity 302 corresponds to a spectral sensitivity characteristic of an image sensor corresponding to a color filter R2 in FIG. 2. Relative spectral sensitivity 303 corresponds to a spectral sensitivity characteristic of an image sensor corresponding to a color filter G1 in FIG. 2 and relative spectral sensitivity 304 corresponds to a spectral sensitivity characteristic of an image sensor corresponding to a color filter G2 in FIG. 2. Relative spectral sensitivity 305 corresponds to a spectral sensitivity characteristic of an image sensor corresponding to a color filter B1 in FIG. 2 and relative spectral sensitivity 306 corresponds to a spectral sensitivity characteristic of an image sensor corresponding to a color filter B2 in FIG. 2.

The image sensors corresponding to each color filter are classified into three groups shown below for a description hereinafter: a group of R (red) including the spectral sensitivity characteristics 301 (R1) and 302 (R2), a group of G (green) including the spectral sensitivity characteristics 303 (G1) and 304 (G2), and a group of B (blue) including the spectral sensitivity characteristics 305 (B1) and 306 (B2). These groups are determined according to differences between three different basic wavelengths corresponding to three preset stimulus values and spectral sensitivity characteristics of the image sensor corresponding to the color filter (main wavelength of the color filter). For example, wavelengths (R≈600 nm, G≈540 nm, B≈450 nm) at which a color matching function takes the maximum value in an RGB colorimetric system are set as three different basic wavelengths and the group is determined based on differences between the wavelength at which the color matching function takes the maximum value and the wavelength at which the spectral sensitivity characteristic of each image sensor takes the maximum value. For example, the spectral sensitivity characteristic 301 takes the maximum value at about 620 nm and the difference from the wavelength (600 nm) at which R of the color matching function takes the maximum value is 20 nm, the difference from the wavelength (540 nm) at which G takes the maximum value is 80 nm, and the difference from the wavelength (450 nm) at which B takes the maximum value is 170 nm. Therefore, the image sensor corresponding to the color filter illustrating the spectral sensitivity characteristic 301 is classified into the group of R where the difference becomes the smallest.

In the present exemplary embodiment, image sensors are classified according to, after setting wavelengths at which a color matching function takes the maximum value in the RGB colorimetric system as three different basic wavelengths corresponding to three stimulus values, differences thereof from the wavelength at which the spectral sensitivity characteristic of each image sensor takes the maximum value, but the present invention is not limited to this. For example, average wavelengths at which a color matching function takes the maximum value in an XYZ colorimetric system may be set as three different basic wavelengths corresponding to three stimulus values to classify image sensors based on differences thereof from the average wavelength of the spectral sensitivity characteristic of each image sensor.

The light (object image) of the object reaching the sensor unit 103 is photoelectrically converted by each device (hereinafter, referred to as a pixel) of the sensor unit 103 and an electric signal is read pixel by pixel. The read pixel is sampled and amplified with a predetermined gain by a correlation double sampling/gain control circuit (CDS/AGC circuit) 104 and then, converted into a digital signal by an analog-digital conversion circuit (A/D conversion circuit) 105. The A/D converted digital signal is written into a buffer memory 106 and read for signal processing described below.

In the present exemplary embodiment, there are two kinds of processing on an image signal stored in the buffer memory 106. The first signal processing is performed by a color number reduction processing unit 110 to a gamma processing unit 113. In the first signal processing, a preview image used for checking of a photographed image by the user in advance is displayed in a monitor unit 118, which is a display device such as a thin-film transistor (TFT) liquid crystal and organic electroluminescence (EL), and an image signal used for determining amounts to control the focus lens 101 and the like is generated. The second signal processing is performed by an interpolation unit 107 and a white balance processing unit (WB processing unit) 108. In the second signal processing, a high-definition image signal (high-precision image signal) to be recorded in a recording medium 123 is generated.

First, the first signal processing to generate an image signal for the preview display will be described in detail.

The color number reduction processing unit 110 reduces the color number of image data of six channels (six bands) including R1, R2, G1, G2, B1, and B2 stored in the buffer memory 106 to generate image data of three channels (three bands) including R, G, and B that can be displayed in the monitor unit 118. If the number of pixels that can be displayed in the monitor unit 118 is smaller than that of the sensor unit 103, thinning-out processing of pixels may be performed at the same time.

Figures 4A, 4B, 4C, 4D:
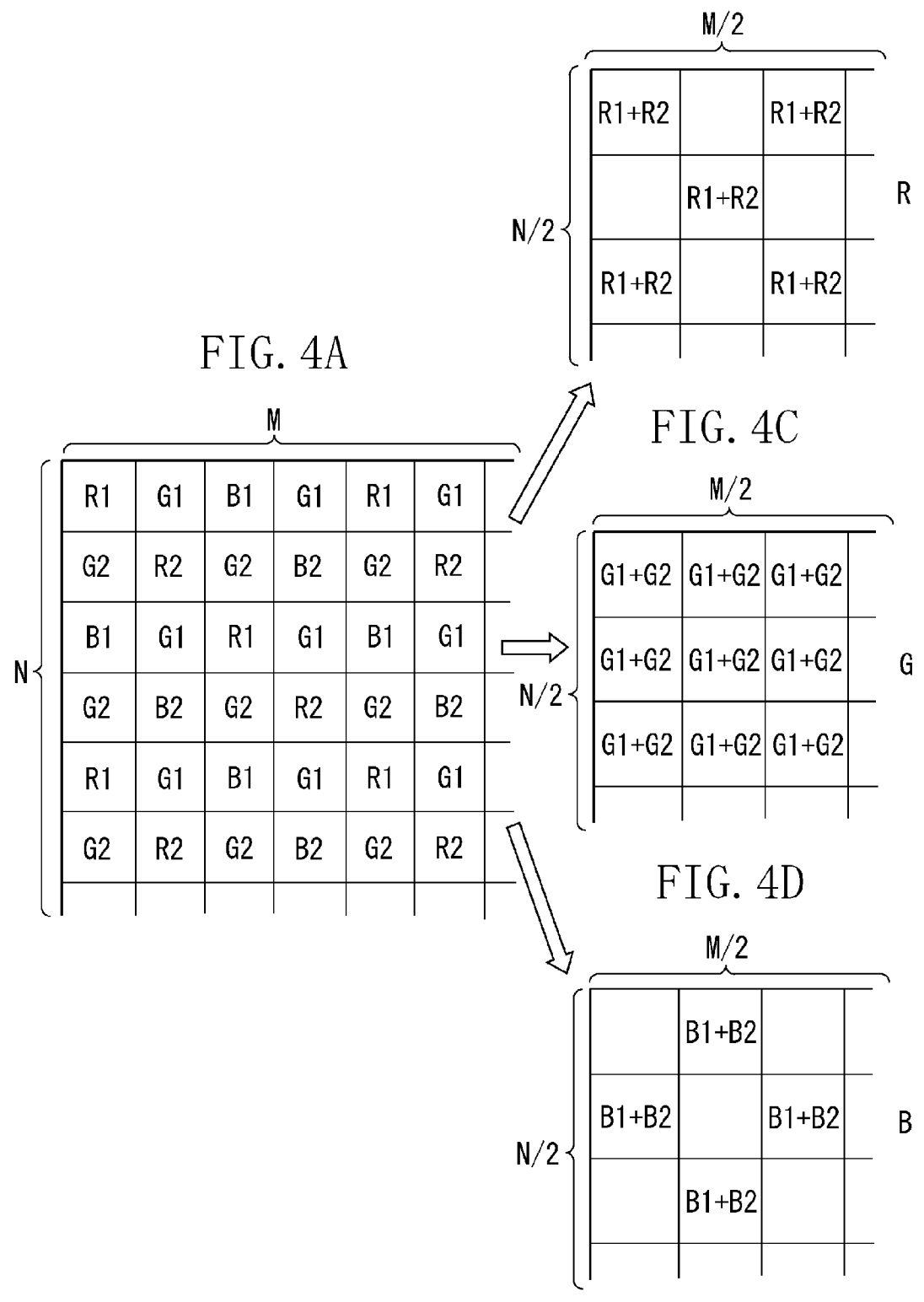

FIG. 4 is a diagram illustrating processing by the color number reduction processing unit 110. FIG. 4A illustrates the arrangement of pixels in the sensor unit 103 and it is assumed that there are M pixels horizontally arranged and N pixels vertically arranged (M and N are natural numbers and this applies also below). FIGS. 4B, 4C, and 4D illustrate what corresponds to processing results by the color number reduction processing unit 110 and signify image data holding (M/2) pixels horizontally and (N/2) pixels vertically in three planes of R, G, and B, respectively. In the present exemplary embodiment, it is assumed that the monitor unit 118 can display (M/2) pixels horizontally and (N/2) pixels vertically.

The processing by the color number reduction processing unit 110 in the present exemplary embodiment will be described below with reference to FIG. 4. In the example illustrated in FIG. 4, the color number is reduced and pixels are thinned out at the same time by regarding 2×2 pixels in FIG. 4A as one pixel in FIGS. 4B to 4D. More specifically, for example, four pixels of R1, R2, G1, and G2 are arranged at the upper left in FIG. 4A and output signals (pixel values) of pixels in the same group from these pixels are added to set corresponding pixel values of R, G, and B.

Here, R=R1+R2 is set as the pixel value at the upper left of the R plane illustrated in FIGS. 4B and G=G1+G2 is set as the pixel value at the upper left of the G plane illustrated in FIG. 4C. Since no pixel of the B group is contained in the four pixels at the upper left in FIG. 4A, the pixel value at the upper left of the B plane illustrated in FIG. 4D cannot be determined. For pixels as to which the pixel value cannot be determined, the pixel value is interpolated by processing of an interpolation unit 111 for each plane of R, G, and B based on surrounding pixel values.

When the processing to reduce the color number is performed by the color number reduction processing unit 110 by regarding, as described above, 2×2 pixels in FIG. 4A as one pixel in FIGS. 4B to 4D, image data of three planes of R, G, and B illustrated in FIGS. 4B to 4D is generated respectively in the end. Pixels are present in a checkered pattern in the R plane and the B plane and both planes are related in such a way that no pixel of B is present at a position where a pixel of R is present and conversely, no pixel of R is present at a position where a pixel of B is present. The G plane has pixel values for all pixels.

By adding output signals (pixel values) of pixels in each group to generate three plane images of R, G, and B, noise contained in each pixel is reduced. Particularly, each spectral sensitivity characteristic illustrated in FIG. 3 has narrower bands than spectral sensitivity characteristics composed of color filters of conventional three bands of R, G, and B because the color number is six. Thus, due to insufficient sensitivity, there is a concern about an increase in noise. In contrast, by performing processing in a color temperature estimation unit 115 or an AF control unit 120 using an image signal in which, as described above, noise is reduced, not only a preview of a multi-band camera can be given easily, but also the precision or processing speed of each piece of processing can be improved.

Returning to FIG. 1, pixel interpolation processing is performed by the interpolation unit 111 on the image data obtained from the color number reduction processing unit 110. The interpolation unit 111 estimates the pixel value of a pixel having no pixel value (a pixel for which the pixel value cannot be determined) in the R plane illustrated in FIG. 4B and the B plane illustrated in FIG. 4D from pixel values around the pixel. For example, the pixel value is estimated by calculating an average value of neighboring pixel values, up and down, left and right. However, the interpolation processing is not limited to this and, for example, higher-quality image interpolation processing can be performed by detecting an edge direction from image data of, for example, the G plane and calculating a weighted average with increased weighting of pixels along the direction. With the processing by the interpolation unit 111, image data composed of three planes of R, G, and B that is complete and exactly synchronized can be acquired.

Next, a white balance processing unit (WB processing unit) 112 performs white balance processing. The white balance processing is processing to multiply pixel values of R and B by a coefficient so that R=G=B holds for a colorless object even if photographed under any light source and is represented by R=αR and B=βB, where coefficients α and β are coefficients determined by the color temperature estimation unit 115.

A gamma processing unit (γ) 113 performs a gamma conversion on image data on which the white balance processing has been performed to cancel out gamma characteristics of the monitor unit 118. More specifically, if gamma characteristics of the monitor unit 118 are represented by 2.2, respective image data of R, G, and B is multiplied by 1/2.2 (≈0.45). Then, image data output from the gamma processing unit 113 is written into a buffer memory 114.

A display control unit 116 generates and controls a display signal to be displayed in the monitor unit 118. The image data written into the buffer memory 114 is converted into an analog signal by a digital/analog conversion circuit (D/A conversion circuit) 117 via the display control unit 116 before being displayed in the monitor unit 118.

The color temperature estimation unit 115 estimates the color temperature of a photographing light source based on the image data written into the buffer memory 114 to determine white balance coefficients α and β. If, for example, average pixel values of each plane of R, G, and B are Rave, Gave, and Bave, respectively, the color temperature estimation unit 115 calculates the coefficients α and β by α=Gave/Rave and β=Gave/Bave. However, the calculation method of the coefficients α and β by the color temperature estimation unit 115 is not limited to this. Various configurations may be adopted such as extraction of a colorless region of image data to determine the white balance coefficients α and β in the same manner as before from the average pixel value of each plane of R, G, and B. Various proposals of algorithms concerning color temperature estimation processing for images composed of three planes of R, G, and B have been made. Also in the present exemplary embodiment, proposed algorithms of the color temperature estimation processing can be applied by reducing the color number to image data of three planes of R, G, and B.

The auto-focus control unit (AF control unit) 120 controls focusing of an object image so that light of an object forms an image on the sensor unit 103 and drives the focus lens 101 accordingly. The AF control unit 120 extracts a high-frequency component in image data of the G plane of image data composed of three planes of R, G, and B written into the buffer memory 114 to determine energy thereof. More specifically, the AF control unit 120 applies a high-pass filter to image data of the G plane to extract a high-frequency component and uses an integrated value of the whole image of the extracted high-frequency component as energy of the high-frequency component.

First, the AF control unit 120 detects the position of the focus lens 101 where energy of the high-frequency component of image data becomes maximum by changing the focus lens 101 by a predetermined driving amount. Next, the AF control unit 120 controls the focus lens 101 so that the focus lens 101 is moved to the detected position. When auto-focus control is performed by extracting a high-frequency component of an image in this manner, high-frequency noise is more likely to exert an influence on the auto-focus control. According to the present exemplary embodiment, however, an image of three planes of R, G, and B which are more advantageous as to noise is easily generated and the auto-focus control for focusing an object image is performed based on the generated image so that improvement in precision or processing speed of focusing can be expected.

The AF control unit 120 may detect the position of a specific object such as the face of a person from image data to determine amounts to control the focus lens 101 so that energy of a high-frequency component at the position becomes maximum. Even when such processing is performed, it becomes possible to easily apply many known techniques such as object detection by forming an image of three planes of R, G, and B by the color number reduction processing unit 110.

An auto-exposure control unit (AE control unit) 119 makes an opening adjustment of the iris 102 so that image data written into the buffer memory 114 has appropriate brightness. In the present exemplary embodiment, an opening adjustment is made so that, for example, the average value of image data of the G plane in image data written into the buffer memory 114 becomes a predetermined value. However, the control method concerning auto-exposure is not limited to this and, for example, a weighted average may be calculated with increased weighting in a center region of image data to perform control so that the weighted average value becomes a predetermined value.

Next, the second signal processing (high-precision image generation processing) that generates a high-definition image signal (high-precision image signal) to be recorded on the recording medium 123 will be described.

An imaging apparatus in the present exemplary embodiment records image data composed of six planes of R1, R2, G1, G2, B1, and B2 in the recording medium 123. Image data recorded in the recording medium 123 is assumed to be processed/edited later according to a user's purpose by a personal computer or the like via a dedicated application. Therefore, image data composed of six planes is image data that is visualized and output with difficulty by a general-purpose device such as a monitor and printer without being processed. In the present exemplary embodiment, it is assumed that the second signal processing (high-precision image generation processing) is performed only when the user presses a shutter button (not illustrated).

The interpolation unit 107 performs interpolation processing on image data stored in the buffer memory 106 in each of six planes of R1, R2, G1, G2, B1, and B2. The interpolation unit 107 determines an optimal interpolated value from each pixel value in the range of, for example, five pixels arranged vertically and five pixels horizontally in the neighborhood of the pixel to be interpolated. More specifically, if the pixel R1, which is the third to the right pixel from the upper left corner and the third to the bottom, is selected as a target pixel in the example illustrated in FIG. 2, pixel values of six planes of R1, R2, G1, G2, B1, and B2 in the target pixel can be determined according to the method described below. To determine the pixel value of R2 in the target pixel, two pixels of R2 are contained in the region of 5×5 pixels in the neighborhood and thus, the average value of these pixel values is set as the pixel value of R2 in the target pixel. Similarly, to determine the pixel value of G1 in the target pixel, six pixels of G1 are contained in the neighboring region and thus, the average value of these pixel values is set as the pixel value of G1 in the target pixel. Regarding pixel values of G2, B1, and B2 in the target pixel, the pixel values in the target pixel are similarly acquired.

The interpolation method used by the interpolation unit 107 is not limited to this. Various method may be used, for example, the interpolation unit 107 may generate image data of G in advance by regarding pixels of G1 and G2 as the same G and detect edge information of the image data of G to calculate a weighted average by adaptively changing weight in a neighboring region of the target pixel.

The WB processing unit 108 performs white balance processing on image data composed of six planes of R1, R2, G1, G2, B1, and B2. Correction coefficients used for the white balance processing may be calculated from the image data of six planes, but in the present exemplary embodiment, the coefficients $\alpha$ and $\beta$ determined by the color temperature estimation unit 115 will be used without change. In this case, R1=$\alpha$·R1·R2ave/R1ave and R2=$\alpha$·R2·R1ave/R2ave are obtained for the image data after the white balance processing. Similarly, B1=$\beta$·B1·B2ave/B1ave, B2=$\beta$·B2·B1ave/B2ave, G1=G1·G2ave/G1ave, and G2=G2·G1ave/G2ave are obtained, where R1ave, R2ave, G1ave, G2ave, B1ave, and B2ave are average values of pixels in each plane. Thus, high-precision white balance corrections can be made more easily in the color temperature estimation unit 115 by using white balance coefficients obtained by using a known high-level algorithm from image data of three planes of R, G, and B.

R1ave, R2ave, G1ave, G2ave, B1ave, and B2ave are set to be average values of pixels in each plane, but the present invention is not limited to this. If, for example, a colorless region is extracted to determine the coefficients $\alpha$ and $\beta$ by the color temperature estimation unit 115, average values of R1, R2, G1, G2, B1, and B2 corresponding to the colorless region may be set as the R1ave, R2ave, G1ave, G2ave, B1ave, and B2ave.

Image data obtained after white balance corrections by the WB processing unit 108 is written into a buffer memory 109. Compression processing is performed on an image written into the buffer memory 109 by a recorded data generation unit 121, and the photographing date/time and tag information concerning a preview image written into the buffer memory 114 are attached thereto. Then, the image is recorded in a recording medium 123 such as a magnetic tape, optical disk, and semiconductor memory via a recording processing unit 122.

According to the first exemplary embodiment, output signals (pixel values) of pixels of R1, R2, G1, G2, B1, and B2 are classified in association with three stimulus values (R, G, B) and the color number is reduced by performing addition processing of output signals (pixel values) in each classification to generate an image signal of three bands of R, G, and B. Then, the generated image signal of three bands of R, G, and B is used for the preview display or AF control.

Accordingly, it becomes possible not only to check a photographed image easily and immediately, but also to improve the precision and processing speed of processing on the image display of a preview image and AF control.

Next, a second exemplary embodiment of the present invention will be described.

Figure 5:
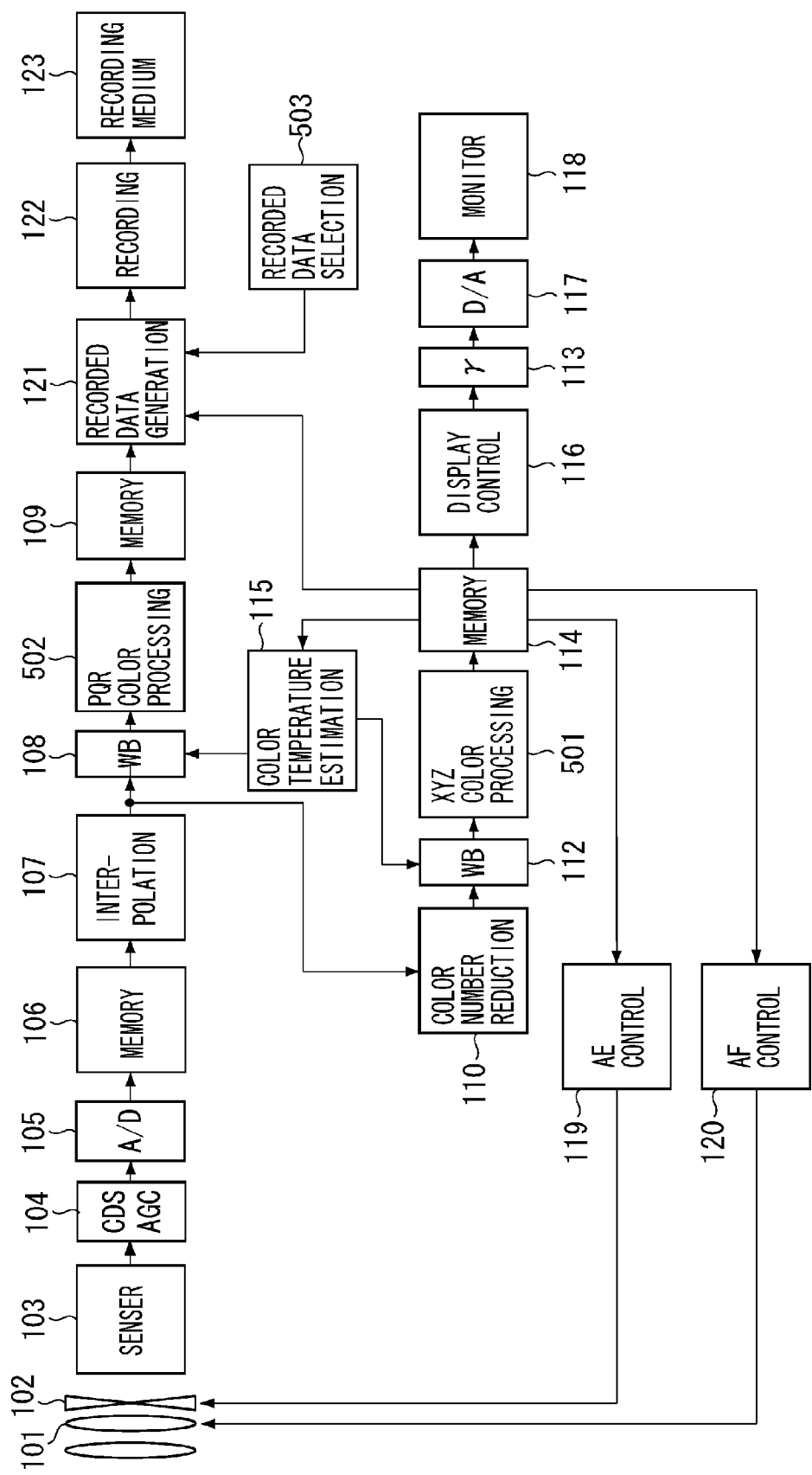
FIG. 5 is a diagram illustrating a configuration example of the imaging apparatus in a second exemplary embodiment.

FIG. 5 is a diagram illustrating a configuration example of the imaging apparatus (for example, a digital still camera) according to the second exemplary embodiment. In FIG. 5, the same reference numerals are attached to components corresponding to those illustrated in FIG. 1. Only differences from the first exemplary embodiment will be described below.

In an imaging apparatus in the second exemplary embodiment, the interpolation unit 107 and the interpolation unit 111 in the first exemplary embodiment is unified and only the interpolation unit 107 is provided. That is, after interpolation processing by the interpolation unit 107, processing is branched to first signal processing to generate image data for a preview, and second signal processing (high-precision image generation processing) to generate image data to be recorded in the recording medium 123.

In the second exemplary embodiment, it is also assumed that image data defined by a color space called XYZPQR is generated to record spectral image information of an object. XYZ is equivalent to an XYZ value in the XYZ colorimetric system. PQR is a color space defined to make the difference between spectral information estimated from the XYZ value and spectral information of an actual object as small as possible.

In the present exemplary embodiment, an XYZ signal is acquired by performing processing by the WB processing unit 112 and an XYZ color processing unit 501 on image data of three planes of R, G, and B generated by the color number reduction processing unit 110. The color number reduction processing unit 110 has interpolated image data supplied thereto and acquires synchronized image data of three planes of R, G, and B by setting R=R1+R2, G=G1+G2, and B=B1+B2. The XYZ color processing unit 501 converts RGB image data into XYZ image data by, for example, matrix operations according to the formula below for each pixel.

$$\begin{bmatrix} X \\ Y \\ Z \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ G \\ B \end{bmatrix} \quad (1)$$

where $a_{11}$ to $a_{33}$ are matrix coefficients that are preset values.

Image data processed by the color number reduction processing unit 110, the WB processing unit 112, and the XYZ color processing unit 501 is written into the buffer memory 114. Image data written into the buffer memory 114 is displayed, like in the first exemplary embodiment, in the monitor unit 118 as a preview image. Image data written into the buffer memory 114 also is referenced, like in the first exemplary embodiment, in processing performed by the color temperature estimation unit 115, the AE control unit 119, and the AF control unit 120.

On the other hand, a PQR signal is acquired by processing in the WB processing unit 108 and a PQR color processing unit 502. That is, the WB processing unit 108 makes white balance corrections, like in the first exemplary embodiment, on image data of six planes of R1, R2, G1, G2, B1, and B2 on which interpolation processing has been performed and which has been synchronized by the interpolation unit 107.

The PQR color processing unit 502 calculates a PQR value of each pixel from image data of six planes by, for example, matrix operations according to the formula below for each pixel.

$$\begin{bmatrix} P \\ Q \\ R \end{bmatrix} = \begin{bmatrix} b_{11} & b_{12} & b_{13} & b_{14} & b_{15} & b_{16} \\ b_{21} & b_{22} & b_{23} & b_{24} & b_{25} & b_{26} \\ b_{31} & b_{32} & b_{33} & b_{34} & b_{35} & b_{36} \end{bmatrix} \begin{bmatrix} R1 \\ R2 \\ G1 \\ G2 \\ B1 \\ B2 \end{bmatrix} \quad (2)$$

where $b_{11}$ to $b_{36}$ are matrix coefficients that are preset values.

Image data generated by the WB processing unit 108 and the PQR color processing unit 502 is written into the buffer memory 109. Image data written into the buffer memory 109 is combined with XYZ image data written into the buffer memory 114 by the recorded data generation unit 121 to generate image data of six planes of XYZPQR to be recorded in the recording medium 123.

A recorded data selection unit 503 determines whether to record image data of six planes of XYZPQR in the recording medium 123 or to record image data of three planes of only XYZ in the recording medium 123 according to instructions from a user using a user interface (not illustrated) or the like. By making image data to be recorded in the recording medium 123 selectable in this manner, users who do not need image data of six planes of XYZPQR can record only image data of three planes of XYZ. Thus, the recording capacity necessary for recording image data can be reduced according to the purpose of the user. Image data of XYZ is recorded in the above description, but the present invention is not limited to this. For example, the present exemplary embodiment may be configured such that XYZ values are converted into RGB values defined by a standard color space such as sRGB and Adobe RGB before being recorded. With such a configuration, more general-purpose image data can be acquired.

According to the second exemplary embodiment, image data of XYZ and image data of PQR are generated separately and thus, image data can be recorded according to the purpose of the user. Moreover, by calculating image data of XYZ from image data of R, G, and B generated by performing color number reduction processing, noise in image data of XYZ which is more perceptible in terms of human vision characteristics can be reduced. In addition, according to the second exemplary embodiment, like in the first exemplary embodiment, it becomes possible not only to check a photographed image easily and immediately, but also to improve the precision and processing speed of the image display of a preview image and AF control.

In the first exemplary embodiment described above, processing performed by the color number reduction processing unit 110 is not limited to the processing described with reference to FIG. 4 and can handle various cases such as a case when the arrangement of pixels in the sensor unit 103 is different and the resolution of the monitor unit 118 is different. Moreover, the first exemplary embodiment has assumed that the resolution of an image of three planes of R, G, and B generated by the color number reduction processing unit 110 and the resolution of the monitor unit 118 are the same, but the present invention is not limited to this. The monitor unit 118 may have any resolution if appropriate resolution conversions of image data of three planes of R, G, and B generated by the color number reduction processing unit 110 are made by the display control unit 116.

FIGS. 6 and 7 are diagrams illustrating other examples of processing by the color number reduction processing unit 110 that are different from the processing in the first exemplary embodiment described above.

FIG. 6 illustrates an example in which the arrangement of color filters in the sensor unit 103 is different from that illustrated in FIG. 2. In the example illustrated in FIG. 6, like the example illustrated in FIG. 4, when one pixel is formed from 2×2 pixels (four pixels) in FIG. 6A, image data of three planes of R, G, and B illustrated in FIGS. 6B, 6C, and 6D, respectively, is obtained. All four pixels belong to the same group in the example illustrated in FIG. 6 and thus, R, G, and B can be represented by R=2·(R1+R2), G=2·(G1+G2), and B=2·(B1+B2). In such a case, one pixel is formed from twice the number of pixels in image data of three planes of R, G, and B when compared with the first exemplary embodiment and thus, improvement of S/N by about 3 dB can be expected.

Figures 7A, 7B, 7C, 7D:
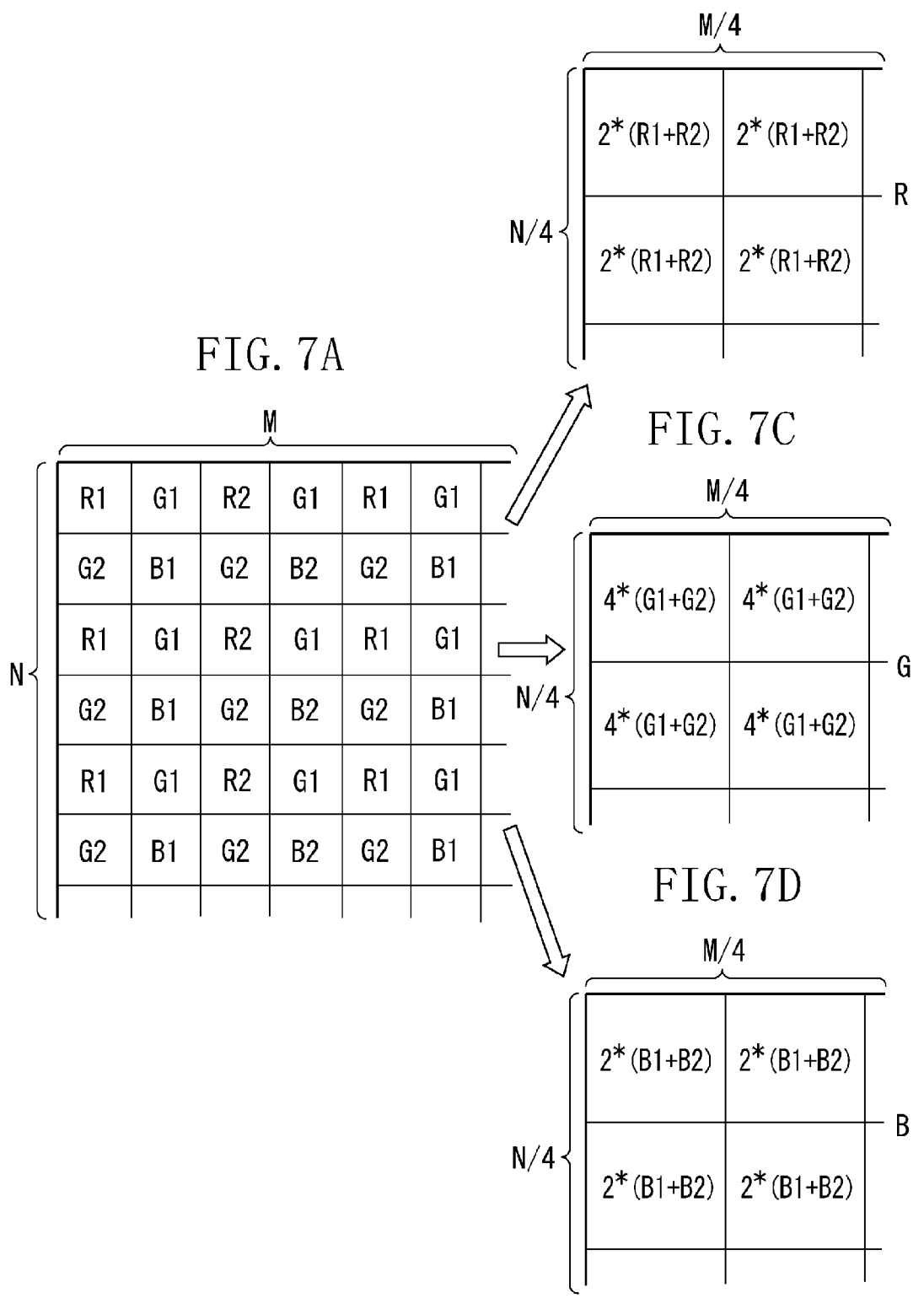

FIG. 7 illustrates an example in which numbers of pixels of three planes of R, G, and B generated by the color number reduction processing unit 110 are ¼ of the number of pixels in the sensor unit 103 vertically arranged and ¼ of the number of pixels in the sensor unit 103 horizontally arranged. In the example illustrated in FIG. 7, 4×4 pixels (16 pixels) in FIG. 7A become one pixel in FIGS. 7B, 7C, and 7D and thus, a pixel of each group is present for all pixels in each plane of R, G, and B. In such a case, processing performed by the interpolation unit 111 is not necessary so that image data for a preview can be acquired more easily.

In the first and second exemplary embodiments described above, the color number reduction processing unit 110 classifies six kinds of output signals of R1, R2, G1, G2, B1, and B2 into three kinds and the color number is reduced by performing addition processing in each classification to generate an image of three planes, but the present invention is not limited to this. For example, an image of three planes may be generated by selecting from six output signals three output signals that minimize differences between three different basic wavelengths that are preset corresponding to three stimulus values and spectral sensitivity characteristics of image sensors corresponding to color filters (main wavelengths of color filters).

Software programs to realize functions of the first and second exemplary embodiments described above are supplied to a computer (a central processing unit (CPU) or microprocessing unit (MPU)) in an apparatus or a system connected to various devices so that various devices can be operated to realize the functions of the exemplary embodiments. Moreover, achievement obtained by causing the various devices to operate according to programs stored in the computer of the system or the apparatus is included in the scope of the present invention.

In this case, the software programs themselves realize functions of image processing of the above exemplary embodiments, so that programs themselves constitute the present invention. Moreover, a unit to supply the programs to the computer, for example, a recording medium storing such programs constitutes the present invention. As a recording medium storing such programs, for example, a flexible disk, a hard disk, an optical disk, a magneto-optical disk, a compact disk read-only memory (CD-ROM), a magnetic tape, a non-volatile memory card, or a ROM can be used.

In addition, when a supplied program realizes a function of the above exemplary embodiments in collaboration with the operating system or other application software operating on a computer, such a program is included in an exemplary embodiment of the present invention.

Further, when a supplied program is stored in a memory provided with a function expansion board or a function expansion unit of a computer and then a CPU or the like provided with the function expansion board or the like performs part or all of actual processing based on instructions of the program, this is also included in the present exemplary embodiment if functions of the above exemplary embodiments are realized by the processing.

Figure 8:
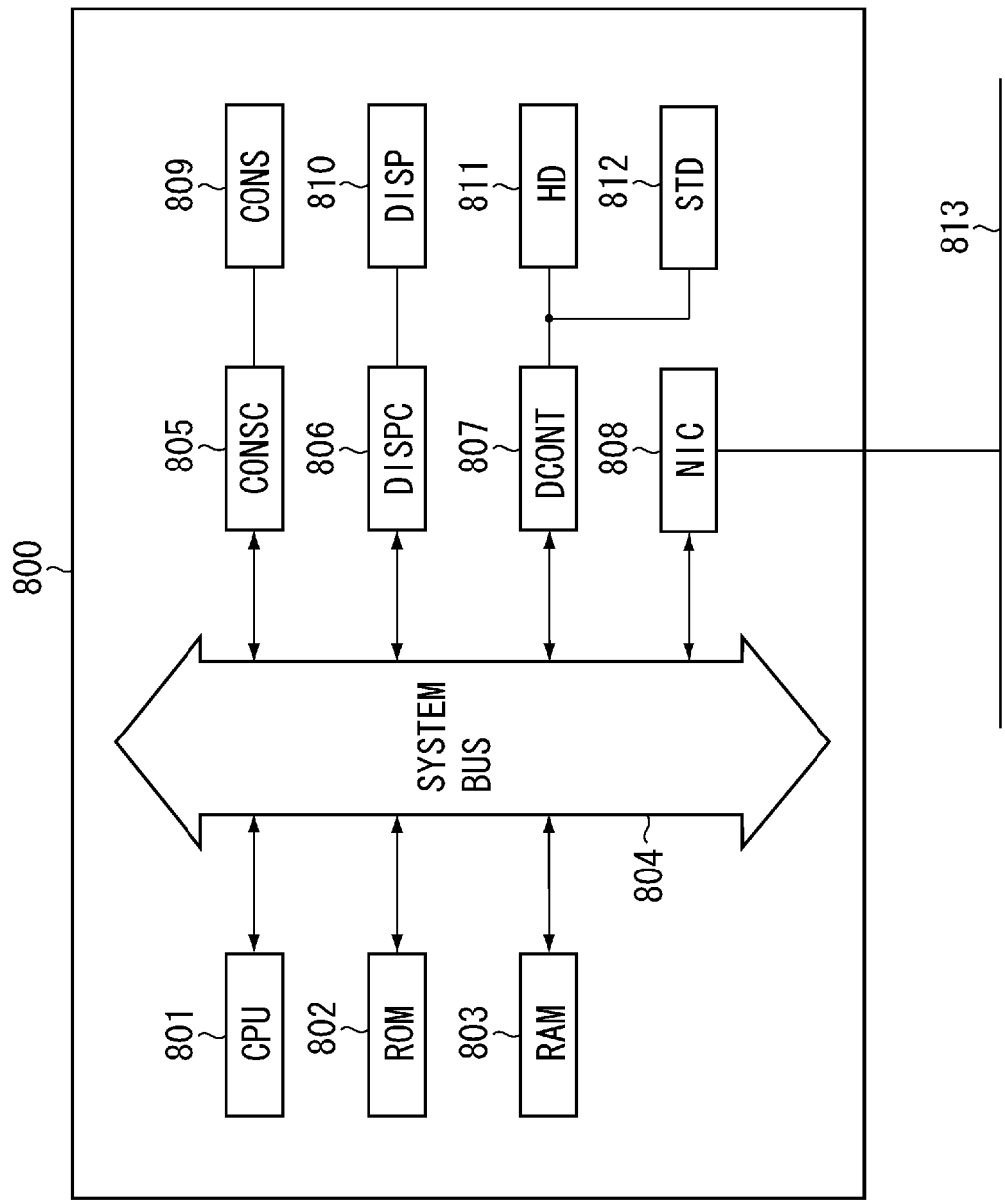
FIG. 8 is a diagram illustrating a computer function capable of performing signal processing according to the present exemplary embodiment.

Signal processing in each exemplary embodiment described above can be performed by, for example, a computer function 800 as illustrated in FIG. 8 and operations in the above exemplary embodiments are performed by a CPU 801 thereof.

The computer function 800 includes, as illustrated in FIG. 8, the CPU 801, a ROM 802, and a random access memory (RAM) 803. The computer function 800 also includes a controller (CONSC) 805 of an operation unit (CONS) 809 and a display controller (DISPC) 806 of a display (DISP) 810 as a display unit such as a cathode ray tube (CRT) and liquid crystal display (LCD). Further, the computer function 800 includes a controller (DCONT) 807 of a hard disk (HD) 811 and a storage device (STD) 812 such as a flexible disk and a network interface card (NIC) 808. These function units 801, 802, 803, 805, 806, 807, and 808 are mutually communicably connected via a system bus 804. The CPU 801 collectively controls each construction unit connected to the system bus 804 by executing software stored in the ROM 802 or the HD 811 or software supplied by the STD 812. More specifically, the CPU 801 performs control to realize operations described in the above exemplary embodiments by reading processing programs to cause above operations, from the ROM 802, the HD 811, or the STD 812, and executing such programs. The RAM 803 functions as a main memory or work area of the CPU 801.

The CONSC 805 controls instruction input from the CONS 809. The DISPC 806 controls the display of the DISP 810. The DCONT 807 controls access to the HD 811 and the STD 812 that store a boot program, various applications, user files, a network management program, and processing programs to realize operations in the above exemplary embodiments. The NIC 808 exchange data with other devices at a network 813.

As many apparently widely different embodiments of the present invention can be made without departing from the spirit and scope thereof, it is to be understood that the invention is not limited to the specific embodiments thereof except as defined in the appended claims.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-146751 filed Jun. 19, 2009, which is hereby incorporated by reference herein in its entirety.

What is claimed is:

1. An imaging apparatus, comprising:
an imaging unit in which image sensors having four kinds of color filters or more with different colors are arranged;
a color number reduction processing unit which generates an image signal of three bands corresponding to three stimulus values, from output signals corresponding to the four kinds of color filters or more output from the imaging unit; and
an auto-focus control unit which controls focusing of an object image in the imaging unit based on the image signal generated by the color number reduction processing unit.

2. The imaging apparatus according to claim 1, further comprising a white balance processing unit which performs white balance processing based on the image signal of the three bands generated by the color number reduction processing unit.

3. The imaging apparatus according to claim 1, wherein the color number reduction processing unit classifies the four kinds of color filters or more into three kinds corresponding to three different basic wavelengths that are preset according to differences between the basic wavelengths and main wavelengths of the color filters and generates the image signal of the three bands by adding the output signals corresponding to the color filters in each classification.

4. The image apparatus according to claim 1, wherein the color number reduction processing unit selects the output signals corresponding to three kinds of the color filters that minimize differences between three different basic wavelengths that are preset and main wavelengths of the color filters, from the output signals corresponding to the four kinds of color filters or more to generate the image signal of the three bands.

5. The imaging apparatus according to claim 1, further comprising a high-precision image generation unit which generates the image signal more precise than the image signal of the three bands generated by the color number reduction processing unit, from the output signals corresponding to the four kinds of color filters or more,
wherein at least one of the image signal of the three bands generated by the color number reduction processing unit and the high-precision image signal generated by the high-precision image generation unit is recorded.

6. The imaging apparatus according to claim 5, further comprising a selection unit which selects the image signal to be recorded.

7. An image processing method, comprising:
generating an image signal of three bands corresponding to three stimulus values, from output signals corresponding to four kinds of color filters or more output from an imaging unit in which image sensors having the four kinds of color filters or more with different colors are arranged; and
controlling focusing of an object image in the imaging unit based on the generated image signal.

8. The image processing method according to claim 7, further comprising:
performing white balance processing based on the image signal of the three bands.

9. The imaging processing method according to claim 7, further comprising:
classifying the four kinds of color filters or more into three kinds corresponding to three different basic wavelengths that are preset according to differences between the basic wavelengths and main wavelengths of the color filters, and
generating the image signal of the three bands by adding the output signals corresponding to the color filters in each classification.

10. The image processing method according to claim 7, further comprising selecting the output signals corresponding to three kinds of the color filters that minimize differences between three different basic wavelengths that are preset and main wavelengths of the color filters, from the output signals corresponding to the four kinds of color filters or more to generate the image signal of the three bands.

11. The imaging processing method according to claim 7, further comprising generating the image signal more precise than the image signal of the three bands, from the output signals corresponding to the four kinds of color filters or more,
   wherein at least one of the image signal of the three bands and the high-precision image signal is recorded.

12. The image processing method according to claim 11, further comprising selecting the image signal to be recorded.

13. A non-transitory storage computer-readable medium characterized by storing a control program to cause a computer to implement an imaging apparatus of claim 1.

* * * * *